(12) United States Patent
Kolman et al.

(10) Patent No.: US 9,122,866 B1
(45) Date of Patent: Sep. 1, 2015

(54) USER AUTHENTICATION

(71) Applicant: EMC Corporation, Hopkinton, MA (US)

(72) Inventors: Eyal Kolman, Tel Aviv (IL); Alon Kaufman, Bnei-Dror (IL); Yael Villa, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 63 days.

(21) Appl. No.: 13/889,805

(22) Filed: May 8, 2013

(51) Int. Cl.
*G06F 7/04* (2006.01)
*G06F 21/45* (2013.01)
*G06F 21/31* (2013.01)

(52) U.S. Cl.
CPC ............... *G06F 21/45* (2013.01); *G06F 21/31* (2013.01)

(58) Field of Classification Search
CPC .................. G06F 2221/2103; G06F 21/45

USPC ............................................................. 726/5
See application file for complete search history.

(56) References Cited

U.S. PATENT DOCUMENTS 8,528,054 B2 * 9/2013 King ................................ 726/4
8,533,118 B2 * 9/2013 Weller et al. .................... 705/44

* cited by examiner

*Primary Examiner* — Peter Shaw
(74) *Attorney, Agent, or Firm* — Krishnendu Gupta; Jason A. Reyes

(57) ABSTRACT

There is disclosed some techniques for selecting a user authentication challenge. In one example, the method comprises the steps of receiving an authentication request to authenticate a user and selecting a user authentication challenge to issue to the user in response to receiving the authentication request. The selection of the user authentication challenge comprises selecting a user authentication challenge among a plurality of user authentication challenges based on the cost effectiveness of the respective user authentication challenges and characteristics of the authentication request.

15 Claims, 6 Drawing Sheets

USER AUTHENTICATION

TECHNICAL FIELD

The present invention relates generally to user authentication, and more particularly to selecting a user authentication challenge as well as determining the strength of a user authentication challenge.

BACKGROUND OF THE INVENTION

In today's high-tech, fast-paced, hyper-connected world, people are spending more and more time on the internet to complete more of their daily activities such as online banking and shopping. The convenience afforded by the access and availability of the online world, however, is not without drawbacks. This increased access has brought with it an unparalleled growth in online fraudulent activity.

Reports about identity takeover, filled with phrases like Trojan, Man in the Middle, Man in the Browser, and Phishing, are increasingly in the news. These emerging threats have triggered a growing awareness by service providers and customers alike. These threats are serious and must be addressed.

Service providers, such as financial institutions, trying to encourage customer activity, while at the same time minimizing losses from financial fraud, are looking for ways to deal with these threats. One possible way is to use a risk-based authentication system with an associated risk engine to assign risk scores to transactions. The transactions with a low risk score can be processed. Those transactions with a high risk score can be rejected or else a further step up challenge can be issued. For example, the risk-based authentication system can be configured to challenge a user to confirm their identity in order to allow a transaction to proceed.

However, there are a number of problems associated with the issuance of a challenge to a user. Firstly, the issuance of a challenge can be expensive. For example, it will be understood that an out-of-band call can have an up-front cost as well as the cost of a person taking the time to make the call. Additionally, the issuance of a challenge can be a source of frustration to the user which can have an adverse effect on the business of a service provider. Moreover, the usefulness of a challenge can erode over a period of time as the challenge is issued more and more.

The present invention is directed towards addressing at least some of the above problems associated with user authentication challenges.

SUMMARY OF THE INVENTION

There is disclosed a computer-implemented method for selecting a user authentication challenge, the method comprising: receiving an authentication request to authenticate a user; and selecting a user authentication challenge to issue to the user in response to receiving the authentication request, wherein selecting the user authentication challenge comprises: identifying a plurality of user authentication challenges for challenging the user; determining the strength of the respective user authentication challenges, wherein the strength of the respective user authentication challenges is dependent on previous results associated with the respective user authentication challenges; setting the cost of the respective user authentication challenges; based on the determined strength and the set cost of the respective user authentication challenges, determining the cost effectiveness of the respective user authentication challenges; and selecting a user authentication challenge among the plurality of user authentication challenges based on the cost effectiveness of the respective user authentication challenges and characteristics of the authentication request.

There is also disclosed a system constructed and arranged for selecting a user authentication challenge, the system comprising: a network interface; a memory; and a controller which includes controlling circuitry coupled to the memory, the controlling circuitry being constructed and arranged to: receive an authentication request to authenticate a user; and select a user authentication challenge to issue to the user in response to receiving the authentication request, wherein the selection of the user authentication challenge comprises: identifying a plurality of user authentication challenges for challenging the user; determining the strength of the respective user authentication challenges, wherein the strength of the respective user authentication challenges is dependent on previous results associated with the respective user authentication challenges; setting the cost of the respective user authentication challenges; based on the determined strength and the set cost of the respective user authentication challenges, determining the cost effectiveness of the respective user authentication challenges; and selecting a user authentication challenge among the plurality of user authentication challenges based on the cost effectiveness of the respective user authentication challenges and characteristics of the authentication request.

There is further disclosed a computer program product having a non-transitory computer readable storage medium which stores code for selecting a user authentication challenge, the code including instructions to: receive an authentication request to authenticate a user; and select a user authentication challenge to issue to the user in response to receiving the authentication request, wherein the selection of the user authentication challenge comprises: identifying a plurality of user authentication challenges for challenging the user; determining the strength of the respective user authentication challenges, wherein the strength of the respective user authentication challenges is dependent on previous results associated with the respective user authentication challenges; setting the cost of the respective user authentication challenges; based on the determined strength and the set cost of the respective user authentication challenges, determining the cost effectiveness of the respective user authentication challenges; and selecting a user authentication challenge among the plurality of user authentication challenges based on the cost effectiveness of the respective user authentication challenges and characteristics of the authentication request.

There is also disclosed a computer-implemented method for determining the strength of a user authentication challenge, the method comprising: identifying a user authentication challenge for challenging a user as part of a user authentication operation; obtaining the results associated with the user authentication challenge as part of previous user authentication operations, wherein the results comprise the immediate and retrospective outcomes associated with the user authentication challenge; acquiring the cost of fraud misdetection and the cost of declaring a genuine authentication as fraudulent; based on the obtained results and the acquired costs, determining the strength of the user authentication challenge.

There is further disclosed a system constructed and arranged for determining the strength of a user authentication challenge, the system comprising: a network interface; a memory; and a controller which includes controlling circuitry coupled to the memory, the controlling circuitry being constructed and arranged to: identify a user authentication challenge for challenging a user as part of a user authentication operation; obtain the results associated with the user authentication challenge as part of previous user authentication operations, wherein the results comprise the immediate and retrospective outcomes associated with the user authentication challenge; acquire the cost of fraud misdetection and the cost of declaring a genuine authentication as fraudulent; based on the obtained results and the acquired costs, determine the strength of the user authentication challenge.

There is still further disclosed a computer program product having a non-transitory computer readable storage medium which stores code for determining the strength of a user authentication challenge, the code including instructions to: identify a user authentication challenge for challenging a user as part of a user authentication operation; obtain the results associated with the user authentication challenge as part of previous user authentication operations, wherein the results comprise the immediate and retrospective outcomes associated with the user authentication challenge; acquire the cost of fraud misdetection and the cost of declaring a genuine authentication as fraudulent; based on the obtained results and the acquired costs, determine the strength of the user authentication challenge.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Figure 1:
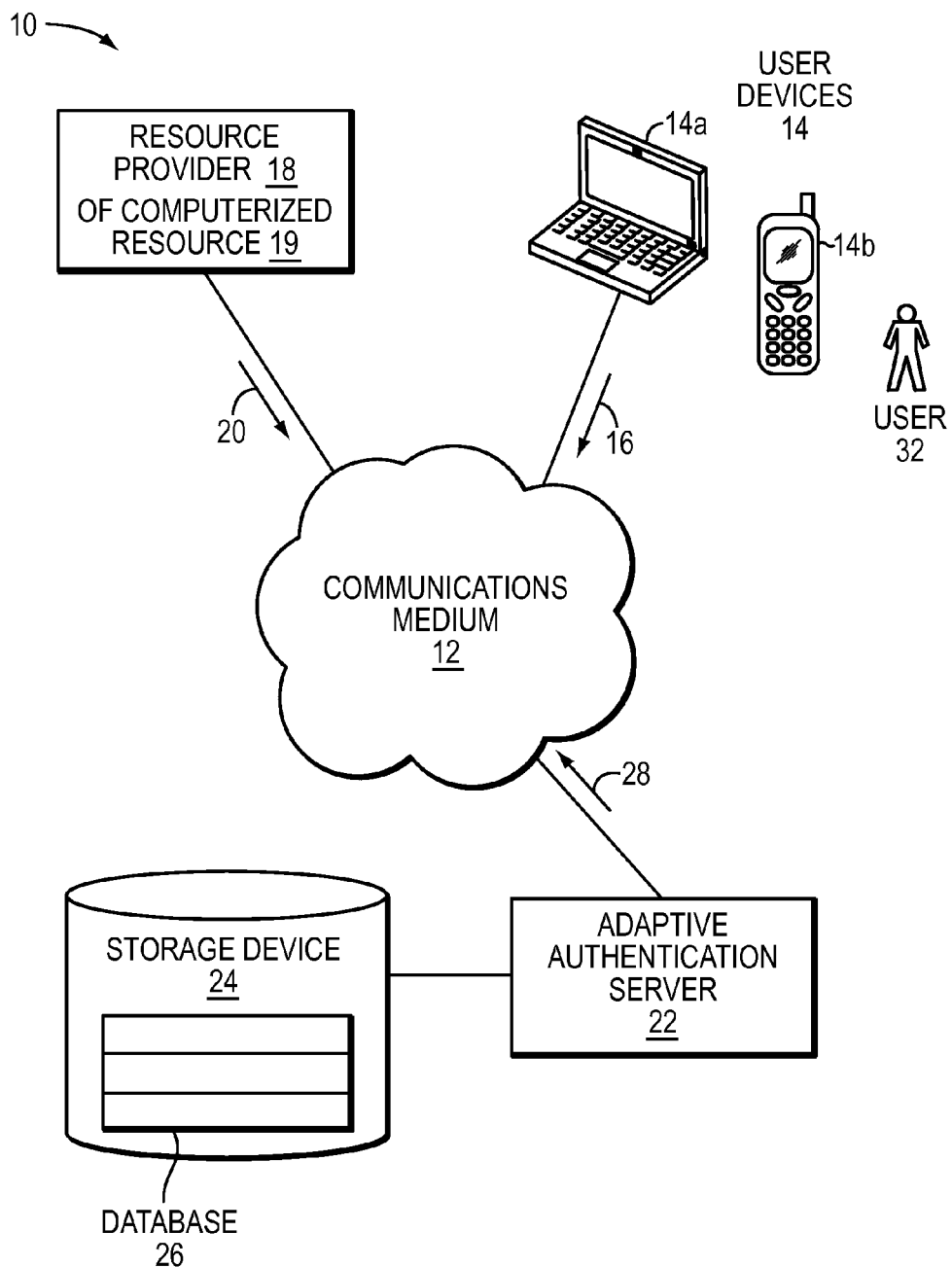
FIG. 1 is a schematic diagram illustrating an electronic environment for carrying out the technique.

Referring to FIG. 1, there is illustrated an electronic environment 10 for carrying out a technique. Electronic environment 10 includes communications medium 12, user devices 14, resource provider 18, and adaptive authentication server 22.

Communication medium 12 provides network connections between user devices 14, resource provider 18, and adaptive authentication server 22. Communications medium 12 may implement a variety of protocols such as TCP/IP, UDP, ATM, Ethernet, Fibre Channel, combinations thereof, and the like. Furthermore, communications media 12 may include various components (e.g., cables, switches/routers, gateways/bridges, NAS/SAN appliances/nodes, interfaces, etc.). Moreover, the communications medium 12 are capable of having a variety of topologies (e.g., queue manager-and-spoke, ring, backbone, multi drop, point to-point, irregular, combinations thereof, and so on).

User devices 14 include smartphones, personal digital assistants, laptop computers, desktop computers, tablet computers, and the like constructed and arranged to submit transaction request 16 to resource provider 18 via communications medium 12.

Resource provider 18 is constructed and arranged to receive transaction 16 from user device 14 via communications medium 12. Resource provider 18 is constructed and arranged to send transaction 20 to adaptive authentication server 22 via communications medium 12. Resource provider 18 is further constructed and arranged to receive adaptive authentication result 28 from adaptive authentication server 22.

Adaptive authentication server 22 is constructed and arranged to receive transaction 20 from resource provider 18 over communications medium 12. Adaptive authentication server 22 is also constructed and arranged to access transaction data in database 26 stored on storage device 24. Adaptive authentication server 22 is further constructed and arranged to send adaptive authentication results 28 to resource provider 18.

During operation, a user 32 initially attempts to login with the resource provider 18 in order to obtain access to a computerized resource 19. In particular, the user 32 provides an authentication request or login request 16 using a particular user device 14. The login request 16 may include a variety of identification information entered by the user 32, as well as ancillary information (e.g., a device identifier from the user device 14, an ISP network address, a geographic location, etc.). The resource provider 18 then sends a request transmission 20 through the communications medium 12 to the adaptive authentication server 22 directing the adaptive authentication server 22 to perform an adaptive authentication operation.

Next, the adaptive authentication server 22 performs the adaptive authentication operation in response to the request transmission 20. In at least one embodiment, the adaptive authentication server 22 performs the adaptive authentication operation by obtaining information concerning the previous transactions from database 26 stored on storage device 24. Database 26 contains a set of entries, each entry being associated with a transaction. Each entry includes values of attributes of the associated transaction. In generating authentication result 28, adaptive authentication server 22 accesses database 26 and locates entries of previous transactions associated with the user identifier. Adaptive authentication server 22 then reads the values from the previous transactions to enable an analysis between the previous transactions and the current transaction 16 such that the authentication result 28 can be generated.

After generating authentication result 28, adaptive authentication server 22 sends authentication result 28 to resource provider 18 over communications medium 12. Based on authentication result 28, resource provider 18 can process transaction 20, cancel transaction 20, or request additional information from user 32.

It should be understood that in this embodiment the resource provider 18 can provide each user device 14 with access to one or more computerized resources 19 following successful user authentication through that user device 14. An example of a suitable resource provider 18 is a data storage array which provides secure access to files, directories, volumes, LUNs, etc. Another example of a suitable resource provider 18 is a web server which provides secure access to various web pages. Yet another example of a suitable resource provider 18 is a server which provides secure user account and/or transactional access such as that for an online banking site, an online store, an online gaming site, and so on. Other types of resource providers are suitable for use as well.

Figure 2:
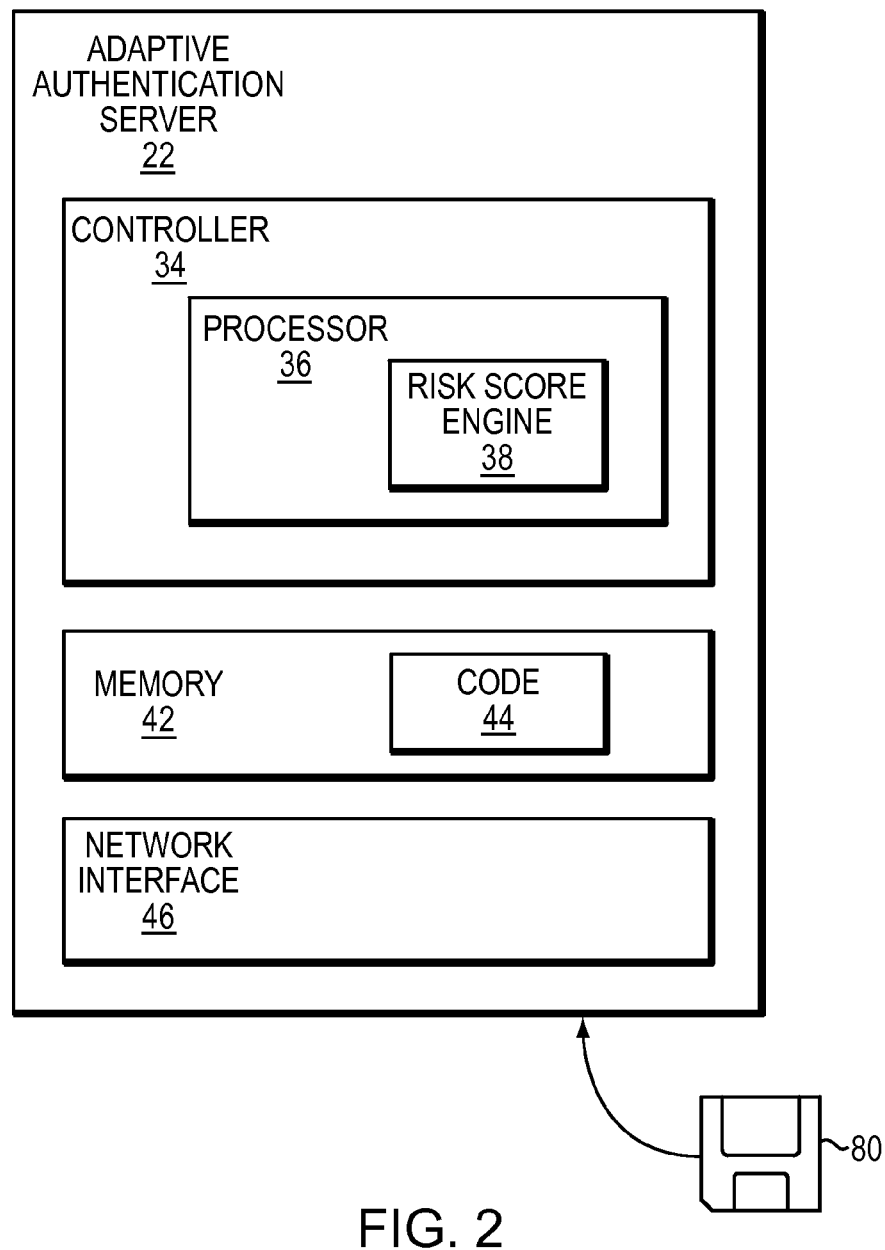
FIG. 2 is a schematic diagram illustrating an adaptive authentication device within the electronic environment shown in FIG. 1.

Further details concerning adaptive authentication server 22 are considered with respect to FIG. 2.

Referring to FIG. 2, there is illustrated some components of adaptive authentication server 22. Adaptive authentication server 22 includes a controller 34, which in turn includes processor 36, a memory 42 and a network interface 46.

Memory 42 is configured to store code which includes code 44 constructed and arranged to process an authentications request. Memory 42 is further configured to store transaction 20 received from resource provider 18. Memory 42 generally takes the form of, e.g., random access memory, flash memory or a non-volatile memory.

Processor 36 takes the form of, but is not limited to, Intel or AMD-based MPUs, and can include a single or multi-cores each running single or multiple threads. Processor 36 is coupled to memory 42 and is configured to execute instructions from code 44 stored in memory 42. Processor 36 includes risk score engine 38.

Risk score engine 38 is constructed and arranged to assign a risk score to a transaction based on values of attributes of previous transactions and transaction 20 stored in memory 42.

Network interface 46 is constructed and arranged to send and receive data over communications medium 12. Specifically, network interface 46 is configured to receive transaction 20 from resource provider 18 over communications medium 12 and to send transaction result 28 to resource provider 18 over communications medium 12. Also, network interface 46 is constructed and arranged to receive data from storage device 24.

During operation, network interface receives transaction 20. Upon the receipt, processor 36 stores its attribute values in memory 42. Risk score engine 38 then executes instructions derived from code 44 to access these attribute values from memory 42 and assigns a risk score to transaction 20. In some arrangements, the risk score is based on a set of Bayesian weights, each of which corresponds to an attribute associated with transaction 20. Risk score engine 38 derives the value of each Bayesian weight from values of the attribute to which the Bayesian weight corresponds for previous transactions which are stored in database 26.

In some arrangements, processor 36 sends a command to perform a lookup operation on database 26 to storage device 24 via network interface 46. In some arrangements, the lookup operation is configured to return previous transactions associated with the customer's user identifier. Processor 36 performs an analysis between the previous transactions and the current transaction 20. Based on the analysis, the risk score engine 38 then assigns a risk score to transaction 20.

Once risk score engine 38 assigns a risk score to transaction 20, network interface sends the risk score in the form of authentication result 28 to resource provider 18 via communications medium 12.

In some arrangements, adaptive authentication server 22 is implemented by a set of processors or other types of control/processing circuitry running software. In such arrangements, the software instructions can be delivered to adaptive authentication server 22 in the form of a computer program product 80 having a computer readable storage medium which stores the instructions in a non-volatile manner. Alternative examples of suitable computer readable storage media include tangible articles of manufacture and apparatus such as CD-ROM, flash memory, disk memory, tape memory, and the like.

Figure 3:
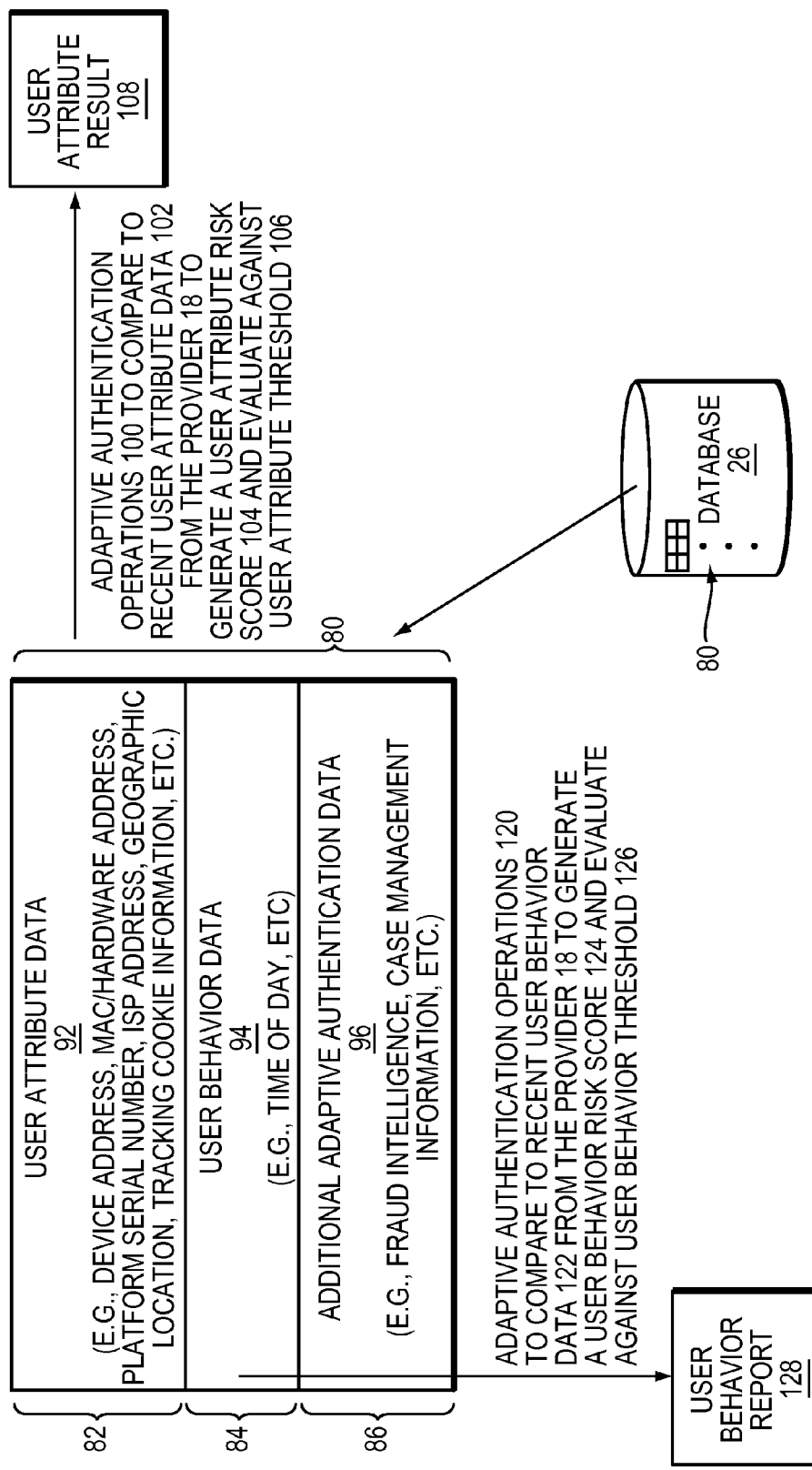
FIG. 3 is a block diagram showing particular aspects of a user database and how user information stored in the user database is utilized by the adaptive authentication server of FIG. 2.

Referring to FIG. 3, there is illustrated particular aspects of the database 26 and how the information stored in the user database 26 is utilized by the adaptive authentication server 22 of FIG. 2. As shown, the database 26 includes user entries 80 which define various features of the users 32 (also see FIG. 1). It should be understood that the database 26 stores values based on previous transactions. As more authentication requests are received, the database 26 accumulates more data and thus better defines certain user attributes and behaviors of the users 32.

Each user entry 80 includes, for a particular user 32, a set of user attribute fields 82, a set of behavior data fields 84, and additional adaptive authentication fields 86. The user attribute fields 82 are constructed and arranged to contain user attribute data 92 of that user 32 (e.g., device address, ISP address, geographic location, tracking cookie information, etc.). The user behavior fields 84 are constructed and arranged to contain user behavior data 94 of that user 32 (e.g., time of day authentication request received, etc.). The additional adaptive authentication fields 86 are constructed and arranged to contain additional information such as data that is appropriate for fraud intelligence (e.g., a note indicating the user has user attributes/behavior which is highly correlated to hacking), case management (e.g., history of previous hacking), and so on.

As shown, the adaptive authentication server 22 performs operations 100 to determine whether to approve or deny user access in response to a current user login attempt. Here, the processor 36 (FIG. 2) of the adaptive authentication server 22 compares the user attribute data 92 to recent user attribute data 102 from the provider 18 to generate a user attribute risk score 104 which is evaluated against a predefined user attribute threshold 106 (e.g., a tunable number between 0 and 1000). If the user attribute risk score 104 is lower than the user attribute threshold 106, the processor 36 gives a user attribute result 108 a first access value to grant the user 32 access to the resource provider 18. However, if the user attribute risk score 104 is higher than the user attribute threshold 106, the processor 36 gives the user attribute result 108 a second access value to deny the user 32 current access to the resource provider 18.

Similarly, the adaptive authentication server 22 performs routine operations 120 to determine whether to flag possible fraudster situations to the resource provider 18 so that the resource provider 18 can take remedial steps (e.g., follow-up with the user 32). In this situation, the processor 36 of the adaptive authentication server 22 compares the user behavior data 94 to recent user behavior data 122 from the resource provider 18 to generate a user behavior risk score 124 which is evaluated against a predefined user behavior threshold 126 (e.g., a tunable number between 0 and 1000). If the user behavior risk score 124 is lower than the user behavior threshold 126, the processor 36 gives a user behavior report 128 a first behavior value indicating that a possible fraudster situation is unlikely. However, if the user behavior risk score 124 is higher than the user behavior threshold 126, the controller 34 gives the user behavior report 128 a second behavior value indicating that a possible fraudster situation is likely and should be further investigated.

Likewise, it should be understood that additional evaluations are made to the data that is received from the resource provider 18. Along these lines, intermediate risk results may be weighted and combined with other intermediate risk results to determine an overall risk score on a sliding continuous scale (e.g., between 0 and 1000). The particular position along the sliding continuous scale provides an indication of the risk associated with a particular user 32, i.e., the likelihood that a fraudster has compromised the user's account with the resource provider 18.

Figure 4:
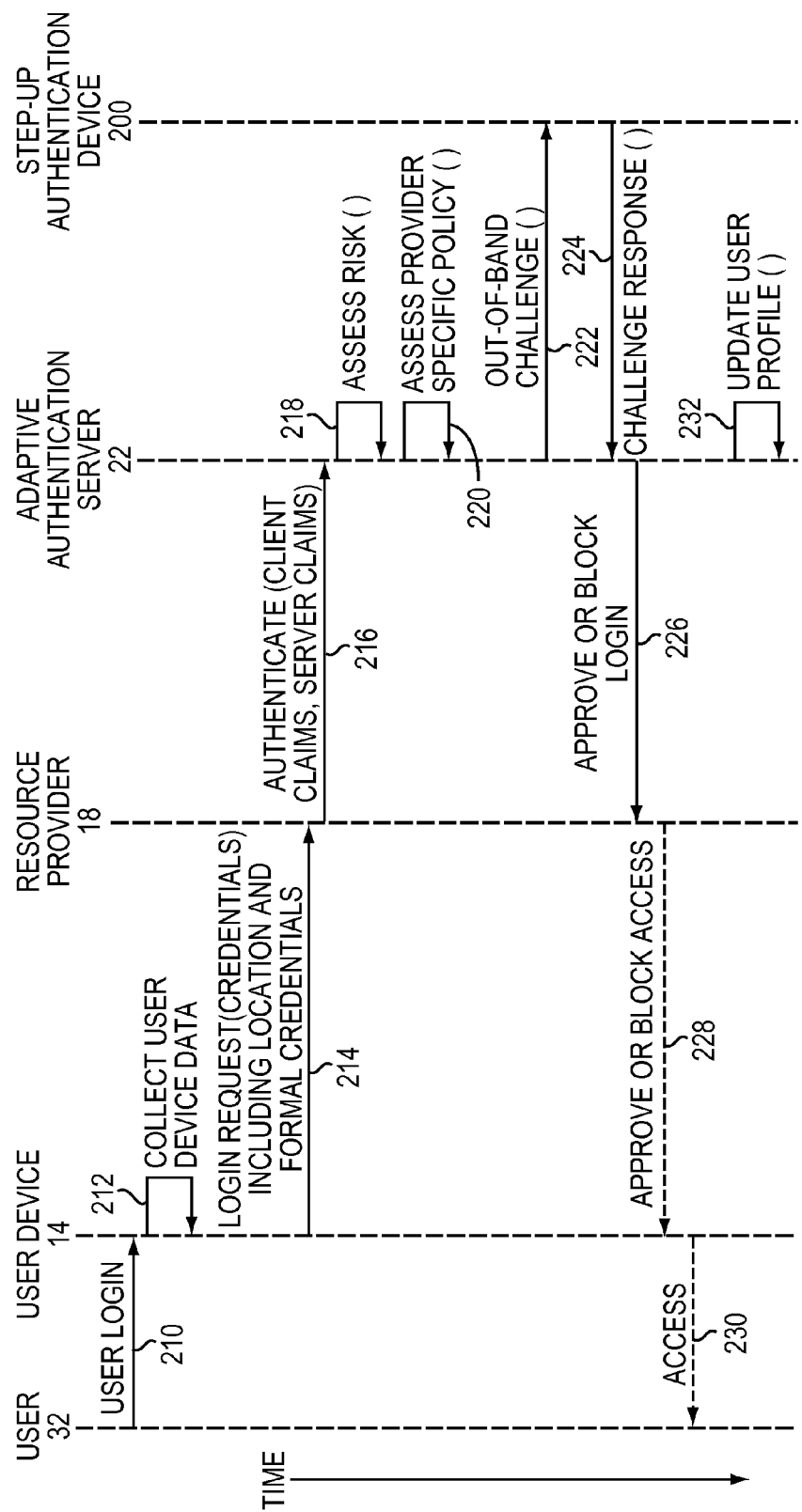
FIG. 4 is a sequence diagram illustrating various communications between components of the environment of FIG. 1 during a user login attempt.

Referring to FIG. 4, there is illustrated a sequence diagram illustrating communications between certain components of the environment 10 during a user login attempt. It should be understood that the environment 10 also includes an out-of-band device 200 such as a user's cell phone, email service, etc. Time increases in the downward direction.

Initially, the user 32 operates the user device 14 to send a login request to the resource provider 18 (arrows 210, 212 and 214). The user device 14 includes user device data (e.g., a device identifier, a certificate, a MAC address, location, other formal credentials, etc.) which uniquely identifies the user device 14 (arrow 212). The resource provider 18 then provides an authentication request to the adaptive authentication server 22 perhaps with additional information such as an IP address, ISP information, and information regarding the user's application (e.g., a browser, etc.) (arrow 216), which assesses the risk (arrow 218) and perhaps performs additional operations which are predefined by the resource provider 18 (arrow 220).

The adaptive authentication server 26 is also equipped to perform additional authentication operations. For example, the adaptive authentication server 26 can issue an out-of-band challenge to the user through the out-of-band device 200 (arrow 222). The out-of-band challenge requires that the user 32 provide an out-of-band response (arrow 224) using the out-of-band device 200 (e.g., a cell phone, email, SMS, etc.). In some arrangements, the challenge is a user specific question that only the user 32 should be able to answer.

Next, the adaptive authentication server 22 makes a decision whether to approve or block the user 32, and sends the result of that decision to the resource provider 18 (arrow 226). Upon receipt of the decision, the resource provider 18 either approves or blocks access to the computerized resource 19 (arrows 228 and 230 which are shown as dashed arrows since access may be blocked). Such operation may include creation of a ticket for follow-up by a fraud department.

Additionally, the adaptive authentication server 26 updates its records in the database 26 with data gathered during the user login attempt (arrow 232). Such information may include identification information of a new user device 14, a new location, and so on.

It should be understood that the exchanges are preferably performed during a user login attempt.

Figure 5:
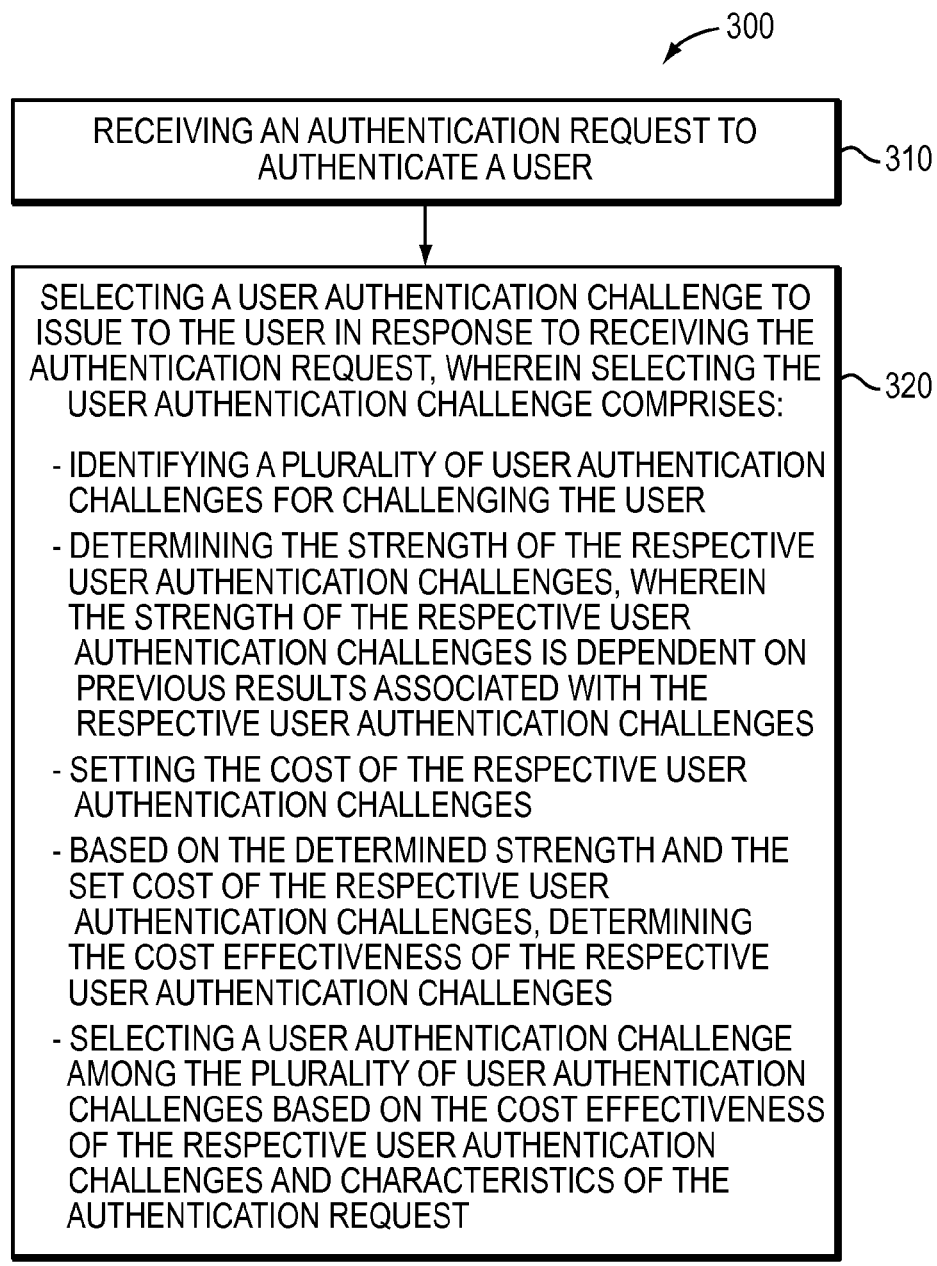
FIG. 5 is a flow chart illustrating a method of carrying out the technique within the electronic environment shown in FIG. 1.

Referring to FIG. 5, there is illustrated a flow chart illustrating a method of carrying out the technique within the electronic environment shown in FIG. 1. The exemplary method 300 can be used for selecting a user authentication challenge. For example, the method can select the user authentication challenge as described in step 222 in FIG. 4. In the flow diagram, the operations are summarized in individual blocks. The operations may be performed in hardware, or as processor-executable instructions that may be executed by a processor. Furthermore, the method 300 may, but need not necessarily, be implemented in the environment of FIG. 1.

At step 310, the method comprises receiving an authentication request to authenticate a user. It should be appreciated from the foregoing description that the authentication request can be a login request originating from one of the user devices 14. For example, the user 32 may be seeking access to the computerized resource 19. As described above, the request can ultimately be received by the adaptive authentication server 22 which makes a decision as to whether to grant access to the computerized resource 19.

At step 320, the method comprises selecting a user authentication challenge to issue to the user in response to receiving the authentication request. It should be understood that there can be a plurality of challenges that can be issued to the user 32. For example, the challenge can be an out-of-band SMS challenge, an out-of-band e-mail challenge, an out-of-band phone challenge, a knowledge-based challenge, a one-time password (OTP) challenge requiring the user to provide an OTP, etc. The information regarding the challenges can be stored in the storage device 24. The server 22 can access the storage device 24 and select one of the challenges to be issued to the user 32.

In this case, the selecting of the user authentication challenge comprises first identifying a plurality of user authentication challenges for challenging the user. As discussed above, the storage device 24 can store the information relating to the challenges enabling the server 22 to select one of the challenges to issue to the user 32. It should be understood that some challenges may be more effective than others especially as time progresses. For example, the effectiveness of a challenge can decrease the more it is used. Also, there can be some challenges that are more effective given the characteristics of the authentication request.

Additionally, the selection of the user authentication challenge comprises determining the strength of the respective identified user authentication challenges. The strength of the respective user authentication challenges will be dependent on previous results, which comprise the immediate and retrospective outcomes, associated with the respective user authentication challenges. For example, the immediate result can be the result initially given by the server 22 after the user 32 responds to a particular user authentication challenge. For example, the immediate result can be a simple pass or fail. The retrospective outcome can be the outcome after an analyst has considered the transaction post the immediate result. The strength of the respective user authentication challenges can also be dependent on the cost of fraud misdetection and the cost of declaring a genuine authentication as fraudulent. This will be described further below with respect to FIG. 6.

Furthermore, the selection of the user authentication challenge comprises setting the cost of the respective user authentication challenges. The cost can relate to a number of factors. For example, the cost can relate to the cost of issuing the user authentication challenge. Additionally, the cost can also relate to the cost of having a paid employee issue the user authentication challenge. Furthermore, the cost can relate to the cost equivalent of the discomfort caused to the user 32 of issuing the user authentication challenge.

Additionally, the selection of the user authentication challenge comprises determining the cost effectiveness of the respective user authentication challenges based on the determined strength and the set cost of the respective user authentication challenges. For example, the cost effectiveness can be a numerical value or ratio obtained by any suitable cost effectiveness formula.

Finally, the selection of the user authentication challenge comprises selecting a user authentication challenge among the plurality of user authentication challenges based on the cost effectiveness of the respective user authentication challenges and the characteristics of the authentication request. After determining the cost effectiveness, the challenges can be ranked based on their respective cost effectiveness. However, the user authentication challenge with the best cost effectiveness may not necessarily be selected to be issued to the user 32. For example, if the authentication request is received from a mobile, and the out-of-band SMS challenge has the best cost effectiveness, then it is pointless to send the out-of-band SMS challenge as a fraudster may have the mobile, in which case the fraudster can successfully deal with the challenge. It may be necessary to choose a knowledge-based challenge or a secret challenge even though the cost effectiveness is not as high as the out-of-band SMS challenge.

Figure 6:
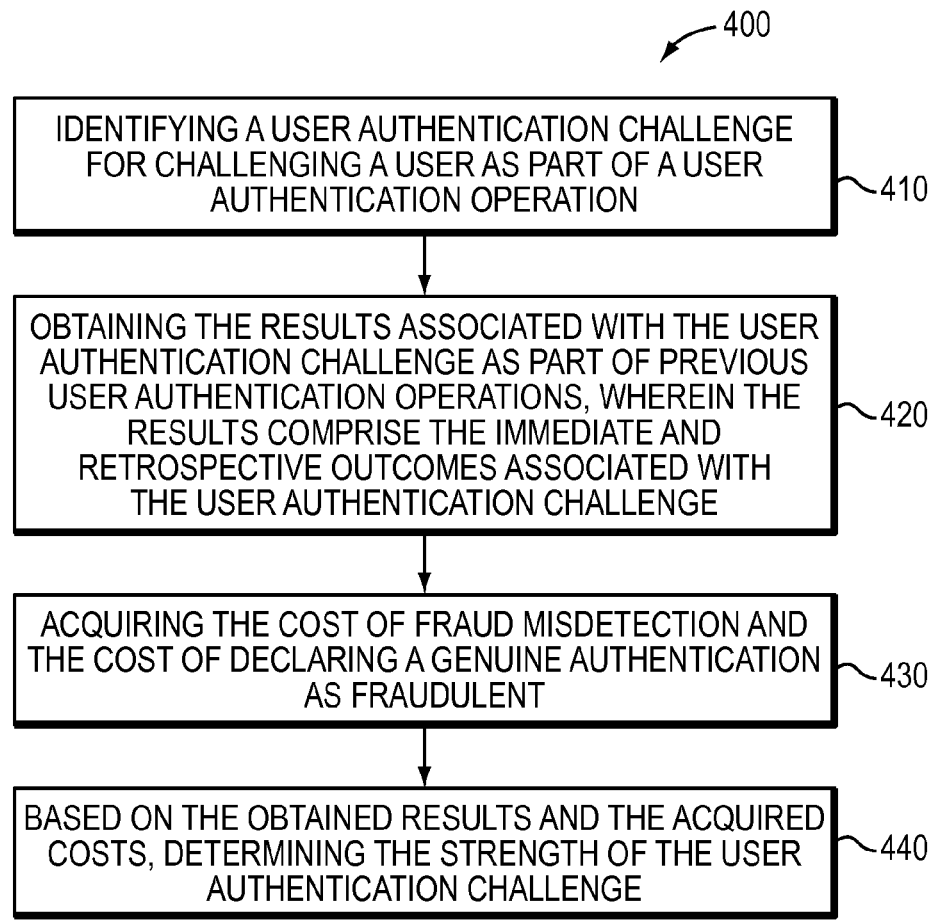
FIG. 6 is a flow chart illustrating a method of carrying out the technique within the electronic environment shown in FIG. 1.

Referring to FIG. 6, there is illustrated a flow chart of a method 400 that may be used in connection with a technique described herein. The exemplary method 400 can be used for determining the strength of a user authentication challenge as described above with respect to FIG. 5.

At step 410, the method comprises identifying a user authentication challenge for challenging a user as part of a user authentication operation. At step 420, the method comprises obtaining the results associated with the user authentication challenge as part of previous user authentication operations, wherein the results comprise the immediate and retrospective outcomes associated with the user authentication challenge. At step 430, the method comprises acquiring the cost of fraud misdetection and the cost of declaring a genuine authentication as fraudulent. At step 440, the method comprises determining the strength of the user authentication challenge based on the obtained results and the acquired costs.

It should be understood that the strength can be evaluated over a set of transactions that were challenged using a specific challenge over some pre-defined period. The following table presents its breakdown into four different cases, based on the transaction tag and the challenge result:

|  | Challenge successfully completed | Challenge failed or was not completed |
|---|---|---|
| Tagged as frauds | FN—False Negatives | TP—True Positives |
| Untagged (or tagged Genuine) | TN—True Negatives | FP—False Positives |

Then, the strength of a specific challenge method, S, can be evaluated using the following formula:

$$S = \frac{\alpha \, TP + \beta TN}{\alpha(TP + FP) + \beta(TN + FN)}$$

Where $\alpha$ and $\beta$ represent the cost of fraud misdetection and of declaring a genuine transaction to be fraudulent, respectively.

It should be understood that the above techniques are helpful not only for adaptive choosing of the step-up challenge but also can improve the learning of the engine. For example, today failed challenges are all treated in the same way with no consideration of the challenging method. The approach described herein will evaluate the challenge strength and the results of stronger challenge will have a higher impact than the results of weaker challenge methods.

It should also be understood that the challenge strength estimation described above can also be applied on a more granular level not only to specific challenge methods but also to the combination of challenge methods and transaction risk factors. For example, the strength of an out-of-band SMS can be evaluated for web-based transactions and for mobile-generated transactions. It should be appreciated that the results may be significantly different. However, it should be noted that this finer strength estimation requires more data in order to evaluate the different combinations of challenge methods and risk factors.

It should be further understood that since challenge methods and effectiveness vary tremendously between implementations and customers, the adaptiveness of the proposed approach may be necessary. For example, different customers may use different challenge methods or different configuration of them.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for selecting a user authentication challenge, the method comprising:
   receiving an authentication request to authenticate a user; and
   selecting a user authentication challenge to issue to the user in response to receiving the authentication request, wherein selecting the user authentication challenge comprises:
      identifying a plurality of user authentication challenges for challenging the user;
      determining the strength of the respective user authentication challenges, wherein the strength is dependent on whether previous user authentication challenges were one of successfully completed, failed or uncompleted, further wherein the strength is dependent on whether previous user authentication were one of tagged as fraud, genuine or unknown;
      setting a cost associated with the respective user authentication challenges; and
      selecting a user authentication challenge among the plurality of user authentication challenges based on the strength of the respective user authentication challenges, the cost of the respective user authentication challenges, and characteristics of the authentication request;
   wherein at least one of the above steps is performed by a hardware processor.

2. The method as claimed in claim 1, wherein the strength of the respective user authentication challenges is based on the previous results of the respective user authentication challenges and a cost of fraud misdetection and a cost of declaring a genuine authentication as fraudulent.

3. The method as claimed in claim 1, wherein the user authentication challenge is selected from the group consisting of:
   out-of-band SMS challenge
   out-of-band phone challenge
   one-time password (OTP) challenge knowledge based challenge
secret question.

4. The method as claimed in claim 1, wherein the cost of the respective user authentication challenges relates to at least one of a cost of issuing the user authentication challenge, a cost of a paid employee issuing the user authentication challenge and a cost equivalent of the discomfort caused to the user of issuing the user authentication challenge.

5. A system constructed and arranged for selecting a user authentication challenge, the system comprising:
   a network interface;
   a memory; and
   a controller which includes controlling circuitry coupled to the memory, the controlling circuitry being constructed and arranged to:
   receive an authentication request to authenticate a user; and
   select a user authentication challenge to issue to the user in response to receiving the authentication request, wherein the selection of the user authentication challenge comprises:
      identifying a plurality of user authentication challenges for challenging the user;
      determining the strength of the respective user authentication challenges, wherein the strength is dependent on whether previous user authentication challenges were one of successfully completed, failed or uncompleted, further wherein the strength is dependent on whether previous user authentication were one of tagged as fraud, genuine or unknown;
      setting a cost associated with the respective user authentication challenges; and
      selecting a user authentication challenge among the plurality of user authentication challenges based on the strength of the respective user authentication challenges, the cost of the respective user authentication challenges, and characteristics of the authentication request.

6. The system as claimed in claim 5, wherein the strength of the respective user authentication challenges is based on the previous results of the respective user authentication challenges and a cost of fraud misdetection and a cost of declaring a genuine authentication as fraudulent.

7. The system as claimed in claim 5, wherein the user authentication challenge is selected from the group consisting of:
   out-of-band SMS challenge
   out-of-band phone challenge
   one-time password (OTP) challenge
   knowledge based challenge
   secret question.

8. The system as claimed in claim 5, wherein the cost of the respective user authentication challenges relates to at least one of a cost of issuing the user authentication challenge, a cost of a paid employee issuing the user authentication challenge and a cost equivalent of the discomfort caused to the user of issuing the user authentication challenge.

9. A computer program product having a non-transitory computer readable storage medium which stores code for selecting a user authentication challenge, the code including instructions to:
   receive an authentication request to authenticate a user; and
   select a user authentication challenge to issue to the user in response to receiving the authentication request, wherein the selection of the user authentication challenge comprises:
      identifying a plurality of user authentication challenges for challenging the user;
      determining the strength of the respective user authentication challenges, wherein the strength is dependent on whether previous user authentication challenges were one of successfully completed, failed or uncompleted, further wherein the strength is dependent on whether previous user authentication were one of tagged as fraud, genuine or unknown;
      setting a cost associated with the respective user authentication challenges; and
      selecting a user authentication challenge among the plurality of user authentication challenges based on the strength of the respective user authentication challenges, the cost of the respective user authentication challenges, and characteristics of the authentication request.

10. The computer program product as claimed in claim 9, wherein the strength of the respective user authentication challenges is based on the previous results of the respective user authentication challenges and a cost of fraud misdetection and a cost of declaring a genuine authentication as fraudulent.

11. The computer program product as claimed in claim 9, wherein the user authentication challenge is selected from the group consisting of:
   out-of-band SMS challenge
   out-of-band phone challenge
   one-time password (OTP) challenge
   knowledge based challenge
   secret question.

12. The computer program product as claimed in claim 9, wherein the cost of the respective user authentication challenges relates to at least one of a cost of issuing the user authentication challenge, a cost of a paid employee issuing the user authentication challenge and a cost equivalent of the discomfort caused to the user of issuing the user authentication challenge.

13. A computer-implemented method for determining the strength of a user authentication challenge, the method comprising:
   identifying a user authentication challenge for challenging a user as part of a user authentication operation;
   obtaining the results associated with the user authentication challenge as part of previous user authentication operations, wherein the results describe whether previous user authentication challenges were one of successfully completed, failed or uncompleted, further wherein the results describe whether previous user authentication challenges are tagged as one of fraud, genuine or unknown;
   acquiring a cost of fraud misdetection and a cost of declaring a genuine authentication as fraudulent; and
   based on the obtained results and the acquired costs, determining the strength of the user authentication challenge;
   wherein at least one of the above steps is performed by a hardware processor.

14. A system constructed and arranged for determining the strength of a user authentication challenge, the system comprising:
   a network interface;
   a memory; and
   a controller which includes controlling circuitry coupled to the memory, the controlling circuitry being constructed and arranged to:
   identify a user authentication challenge for challenging a user as part of a user authentication operation;
   obtain the results associated with the user authentication challenge as part of previous user authentication operations, wherein the results describe whether previous user authentication challenges were one of successfully completed, failed or uncompleted, further wherein the results describe whether previous user authentication challenges are tagged as one of fraud, genuine or unknown;

acquire a cost of fraud misdetection and a cost of declaring a genuine authentication as fraudulent; and based on the obtained results and the acquired costs, determine the strength of the user authentication challenge.

15. A computer program product having a non-transitory computer readable storage medium which stores code for determining the strength of a user authentication challenge, the code including instructions to:

identify a user authentication challenge for challenging a user as part of a user authentication operation;

obtain the results associated with the user authentication challenge as part of previous user authentication operations, wherein the results describe whether previous user authentication challenges were one of successfully completed, failed or uncompleted, further wherein the results describe whether previous user authentication challenges are tagged as one of fraud, genuine or unknown;

acquire a cost of fraud misdetection and a cost of declaring a genuine authentication as fraudulent; and based on the obtained results and the acquired costs, determine the strength of the user authentication challenge.

* * * * *